J. B. LYON.
Manufacture of Bitters and Sauce-Bottle Tubes.

No. 133,947.　　　　　　　　　　　　　Patented Dec. 17, 1872.

UNITED STATES PATENT OFFICE.

JAMES B. LYON, OF PITTSBURG, PENNSYLVANIA.

IMPROVEMENT IN THE MANUFACTURE OF BITTERS AND SAUCE BOTTLE TUBES.

Specification forming part of Letters Patent No. 133,947, dated December 17, 1872.

*To all whom it may concern:*

Be it known that I, JAMES B. LYON, of Pittsburg, in the county of Allegheny and State of Pennsylvania, have invented a new and useful Improvement in Bitters and Sauce Bottle Tubes; and I do hereby declare the following to be a full, clear, and exact description thereof, reference being had to the accompanying drawing forming a part of this specification, in which—

Figure 1:
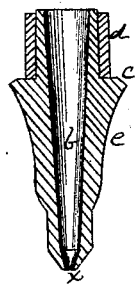
Figure 2:
Figure 3:

Figure 1 is a vertical section of my improved bitters and sauce bottle tube; Fig. 2 is a side view of the same without the cork; and Fig. 3 is a view of the cork.

Like letters of reference indicate like parts in each.

My invention consists in the method of manufacturing pressed-glass bitters and sauce bottle tubes by pressing and grinding, in the manner hereinafter described.

To enable others skilled in the art to make and use my invention I will describe its construction.

Heretofore tubes for bitters and sauce bottles have been made of metal or porcelain.

The tube $e$ is formed in a drop-mold of suitable shape, in which it is pressed by a long tapering plunger, which makes the opening $b$. This plunger does not project entirely through the whole length of the tube, so that after it has been pressed it is necessary to grind the end off slightly to make the opening, as at $x$. The shoulder $c$ is formed by a removable ring or collar of corresponding shape set in the mouth of the mold. After the tube has been finished in the usual way it is fitted with the cork $d$, made for that purpose.

What I claim as my invention, and desire to secure by Letters Patent, is—

The method of manufacturing pressed-glass bitters and sauce bottle tubes by forcing a plunger nearly through the molten glass while inclosed in the mold, and subsequently, after finishing, grinding off the film that covers the end, substantially as described.

In testimony whereof I, the said JAMES B. LYON, have hereunto set my hand.

JAMES B. LYON.

Witnesses:
E. T. CASSIDY,
JOSEPH H. STAVELY.